(12) United States Patent
Dodelin et al.

(10) Patent No.: US 12,238,049 B2
(45) Date of Patent: Feb. 25, 2025

(54) METHOD AND SYSTEM OF CONVERTING EMAIL MESSAGE TO AI CHAT

(71) Applicant: Capital One Services, LLC, McLean, VA (US)

(72) Inventors: Kenneth Dodelin, Arlington, VA (US); Scott Karp, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/052,736

(22) Filed: Nov. 4, 2022

(65) Prior Publication Data

US 2023/0224264 A1 Jul. 13, 2023

Related U.S. Application Data

(63) Continuation of application No. 17/303,758, filed on Jun. 7, 2021, now Pat. No. 11,502,977, which is a
(Continued)

(51) Int. Cl.
*H04L 51/02* (2022.01)
*G06F 16/242* (2019.01)
*G06F 16/9535* (2019.01)
*G06F 40/20* (2020.01)
*H04L 9/40* (2022.01)
(Continued)

(52) U.S. Cl.
CPC ............ *H04L 51/02* (2013.01); *G06F 16/243* (2019.01); *G06F 16/9535* (2019.01); *G06F 40/20* (2020.01); *H04L 51/04* (2013.01); *H04L 51/046* (2013.01); *H04L 51/18* (2013.01); *H04L 61/4511* (2022.05); *H04L 63/1433* (2013.01); *H04L 63/1483* (2013.01); *H04L 67/02* (2013.01); *H04L 67/306* (2013.01)

(58) Field of Classification Search
CPC ... H04L 51/216; H04L 51/04; H04L 12/1859; H04L 51/56
See application file for complete search history.

(56) References Cited

U.S. PATENT DOCUMENTS

| | | |
|---|---|---|
| 7,263,526 B1 | 8/2007 | Busey et al. |
| 8,676,913 B1 * | 3/2014 | Roche ................... G06Q 50/01 709/206 |

(Continued)

*Primary Examiner* — Chirag R Patel
(74) *Attorney, Agent, or Firm* — DLA PIPER LLP (US)

(57) ABSTRACT

Embodiments disclosed herein generally relate to a system and method for initiating an interactive chat via HTTP request. A web server of an organization computing system receives the HTTP request from a web client executing on a remote client. The HTTP request is triggered by a selection of a dialogue request embedded in an electronic mail message. The web server transmits an API call to a back-end computing system of the organization computing system based on information included in the HTTP request. The back-end computing system parses the API call to identify a user identifier corresponding to a user of the remote client device and a request identifier corresponding to the selected dialogue request embedded in the electronic mail message. The back-end computing system initiates the interactive chat via a text-based communication channel. The back-end computing system generates and transmits an electronic message comprising a response to the dialogue request.

20 Claims, 9 Drawing Sheets

Related U.S. Application Data continuation of application No. 16/556,783, filed on Aug. 30, 2019, now Pat. No. 11,032,218, which is a continuation of application No. 16/161,519, filed on Oct. 16, 2018, now Pat. No. 10,404,630, which is a continuation of application No. 15/987,157, filed on May 23, 2018, now Pat. No. 10,148,601.

(51) Int. Cl.
*H04L 51/04* (2022.01)
*H04L 51/046* (2022.01)
*H04L 51/18* (2022.01)
*H04L 61/4511* (2022.01)
*H04L 67/02* (2022.01)
*H04L 67/306* (2022.01)

(56) References Cited

U.S. PATENT DOCUMENTS

| | | |
|---|---|---|
| 2008/0208984 A1 | 8/2008 | Rosenberg et al. |
| 2009/0281966 A1* | 11/2009 | Biggs .................... H04L 51/02 706/11 |
| 2010/0205541 A1 | 8/2010 | Rapaport et al. |
| 2010/0250693 A1 | 9/2010 | Zheng et al. |
| 2014/0379818 A1* | 12/2014 | Cudak ................... H04L 51/216 709/206 |
| 2016/0352677 A1 | 12/2016 | Gordon |
| 2017/0310613 A1 | 10/2017 | Lalji et al. |
| 2018/0234367 A1* | 8/2018 | Lange ................... G06F 16/958 |
| 2019/0012390 A1* | 1/2019 | Nishant ................. G06N 3/006 |
| 2019/0251966 A1* | 8/2019 | Dharne .................. G06F 3/011 |

* cited by examiner

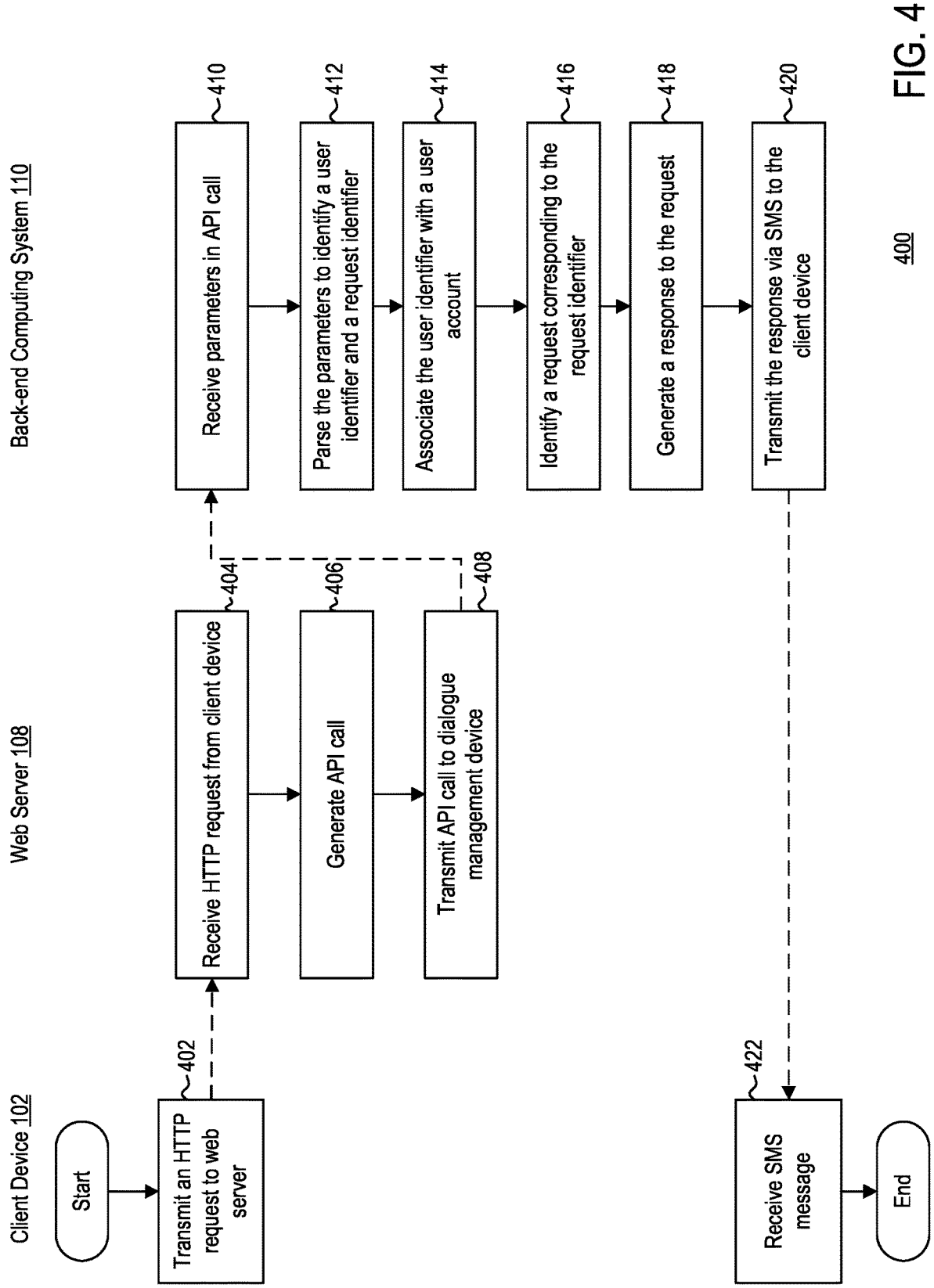

METHOD AND SYSTEM OF CONVERTING EMAIL MESSAGE TO AI CHAT

CROSS-REFERENCE TO RELATED APPLICATION INFORMATION

This is a continuation of U.S. patent application Ser. No. 17/303,758, filed Jun. 7, 2021, which is a continuation of U.S. patent application Ser. No. 16/556,783, filed Aug. 30, 2019, now U.S. Pat. No. 11,032,218, issued Jun. 8, 2021, which is a continuation of U.S. patent application Ser. No. 16/161,519, filed Oct. 16, 2018, now U.S. Pat. No. 10,404,630, issued Sep. 3, 2019, which is a continuation of U.S. patent application Ser. No. 15/987,157, filed May 23, 2018, now U.S. Pat. No. 10,148,601, issued Dec. 4, 2018, which are incorporated by reference in their entireties.

FIELD OF THE DISCLOSURE

The present disclosure generally relates to a method and a system for initiating an interactive chat via a hypertext transfer protocol (HTTP) request.

BACKGROUND

Automated systems for interacting with customers by generating automatic written, auditory, or video responses via web and mobile device application channels are useful ways to provide customers with requested information and perform routine account actions in an expedited, extended hours fashion, without the need to have a large workforce of customer service agents. While helpful, existing systems tend to provide an impersonal and robotic user experience limited by scripted questions and responses with a finite number of permutations used for every customer. Additionally, these systems are unable to personalize the user experience based on a customer's history with the company or organization affiliated with the system.

SUMMARY

Embodiments disclosed herein generally relate to a system and method for initiating an interactive chat via a hypertext transfer protocol (HTTP) request. A web server of an organization computing system receives the HTTP request from a web client executing on a remote client. The HTTP request is triggered by a selection of a dialogue request embedded in an electronic mail message. The web server transmits an application programming interface (API) call to a back-end computing system of the organization computing system based on information included in the HTTP request. The back-end computing system parses the API call to identify a user identifier corresponding to a user of the remote client device and a request identifier corresponding to the selected dialogue request embedded in the electronic mail message. The back-end computing system determines the user to which the user identifier corresponds. The back-end computing system determines the dialogue request to which the request identifier corresponds. The back-end computing system initiates the interactive chat via a text-based communication channel. The back-end computing system generates an electronic message comprising a response to the dialogue request. The back-end computing system transmits the electronic message to a text message client application executing on the remote client device.

In some embodiments, initiating the interactive chat via the text-based communication channel includes the back-end computing system receiving control from the web server.

In some embodiments, the web server transmits a web page to the web client for display, upon receiving the HTTP request from the remote client device.

In some embodiments, determining a user to which the user identifier corresponds includes the back-end computing system querying a database with the user identifier to identify a user account to which the user identifier corresponds.

In some embodiments, the user account includes a telephone number of a remote client device associated with the user.

In some embodiments, transmitting the electronic message to the text message client application executing on the remote client device includes the back-end computing system identifying the telephone number of the remote client device associated with the user. The back-end computing system addressing the electronic message to the telephone number of the remote client device.

In some embodiments, the back-end computing system receives an additional electronic message from the remote client device in the interactive chat session. The back-end computing system identifies an additional request contained in the additional electronic message. The back-end computing system generates a reply electronic message that includes an additional response to the additional request. The back-end computing system transmits the reply electronic message to the text message client application executing on the remote client device.

In some embodiments, the additional request is unrelated to the request.

In another embodiment, a method of establishing an interactive chat session via an HTTP request is disclosed herein. A back-end computing system of an organization computing system establishes a communication channel between a remote client device and the organization computing system. The back-end computing system generates one or more hyperlinks. Each hyperlink corresponds to an actionable request. Each hyperlink includes a request identifier and a user identifier. The back-end computing system generates an electronic mail message that includes the one or more hyperlinks. The back-end computing system transmits the electronic mail message to an address associated with the user identifier. A web server of the organization computing system receives the HTTP request from a web client executing on a remote client device. The HTTP request is triggered by a selection of the one or more hyperlinks. The web server transmits an API call to the back-end computing system based on information included in the HTTP request. The back-end computing system determines a user to which the user identifier corresponds. The back-end computing system determines an actionable request to which the request identifier corresponds. The back-end computing system transfers the communication channel between the organization computing system and the remote client device from a web-based communication channel to a text-based communication channel. The back-end computing system generates an electronic message comprising a response to the identifier request. The back-end computing system transmits the electronic message to a text message client executing on the remote client device. The electronic message is part of an interactive chat.

In some embodiments, generating one or more hyperlinks includes the back-end computing system labeling each hyperlink with a title corresponding to the actionable request.

In some embodiments, determining a user to which the user identifier corresponds includes the back-end computing system querying a database with the user identifier to identify a user account to which the user identifier corresponds.

In some embodiments, the user account includes a telephone number of a remote client device associated with the user.

In some embodiments, transmitting the electronic message to the text message client executing on the remote client device includes the back-end computing system identifying the telephone number of the remote client device associated with the user. The back-end computing system addresses the electronic message to the telephone number of the remote client device.

In some embodiments, the back-end computing system receives a second electronic message from the remote client device as part of the interactive chat. The back-end computing system identifies a second request contained in the additional electronic message. The back-end computing system generates a reply electronic message comprising a second response to the second request. The back-end computing system transmits the reply electronic message to the remote client device via the text message client as part of the interactive chat.

In some embodiments, the second request is unrelated to the request.

In another embodiment, a system is disclosed herein. The system includes a web server and a back-end computing system. The web server includes a first processor and a memory. The memory has programming instructions stored thereon, which, when executed by the first processor, performs an operation. The operation includes generating an API call responsive to receiving an HTTP request from a web client executing on a remote client device. The back-end computing system is in communication with the web server. The back-end computing system includes a second processor and a memory. The memory has programming instructions stored thereon, which, when executed by the second processor, performs an operation. The operation includes receiving the API call from the web server. The operation includes parsing the API call to identify a user identifier corresponding to a user of the remote client device and a request identifier corresponding to a dialogue request associated with the HTTP request. The operation includes determining the user to which the user identifier corresponds. The operation includes determining the dialogue request to which the request identifier corresponds. The operation includes initiating an interactive chat via a text-based communication channel. The operation includes generating, as part of the interactive chat, an electronic message comprising a response to the dialogue request. The operation includes transmitting the electronic message to a text message client application executing on the remote client device.

In some embodiments, the operation of the web server further includes transmitting a web page to the web client for display.

In some embodiments, the operation of determining the user to which the user corresponds includes querying a database with the user identifier to identify a user account to which the user identifier corresponds.

In some embodiments, the user account comprises a telephone number of a remote client device associated with the user.

In some embodiments, the operation of transmitting the electronic message to the client text message client executing on the remote client device includes identifying the telephone number of the remote client device associated with the user and addressing the electronic message to the telephone number of the remote client device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4 is a flow diagram illustrating a method of establishing an interactive chat session via a hypertext transfer protocol (HTTP) request, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure generally relates to a method and a system for initiating an interactive chat via a hypertext transfer protocol (HTTP) request. One or more techniques discuss herein relate to leveraging highly-customized hyperlinks embedded in email correspondence to users that aid in establishing the interactive chat between an organization and the user. For example, the system described herein may generate one or more request prompts based on an identified pattern of customer behavior. Each of the one or more request prompts may be embedded in an email correspondence to the user. For example, upon generating an email correspondence to the user regarding a new credit card payment due, the system may generate one or more request prompts that may include "Check Balance," "Transfer Funds," "What is my statement balance," and the like. Underlying each of the request prompts may be a unique hyperlink. Each hyperlink includes a unique request identifier corresponding to the respective request prompt and a user identifier corresponding to the user's identification.

Upon a selection of a request prompt, the client device may establish a web-based communication channel between the client device and organization. For example, the client device may establish the web-based communication channel by transmitting an HTTP request to a web server. The HTTP request may include information such as the user identifier and the request identifier. The web server may pass this information to a back-end computing system (e.g., via a call to an application programming interface (API)) for further processing.

The back-end computing system may parse the API call to identify the user and the user's request. Based on this information, the back-end computing system may switch the communication channel established between the client device and the organization to a text-message based communication channel. For example, the back-end computing system may respond to the user's request via an interactive chat session. The back-end computing system may transmit a text message (e.g., SMS message) to the client device with the client's requested information. The requested information may be specific to the client based on the client's account with the organization.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
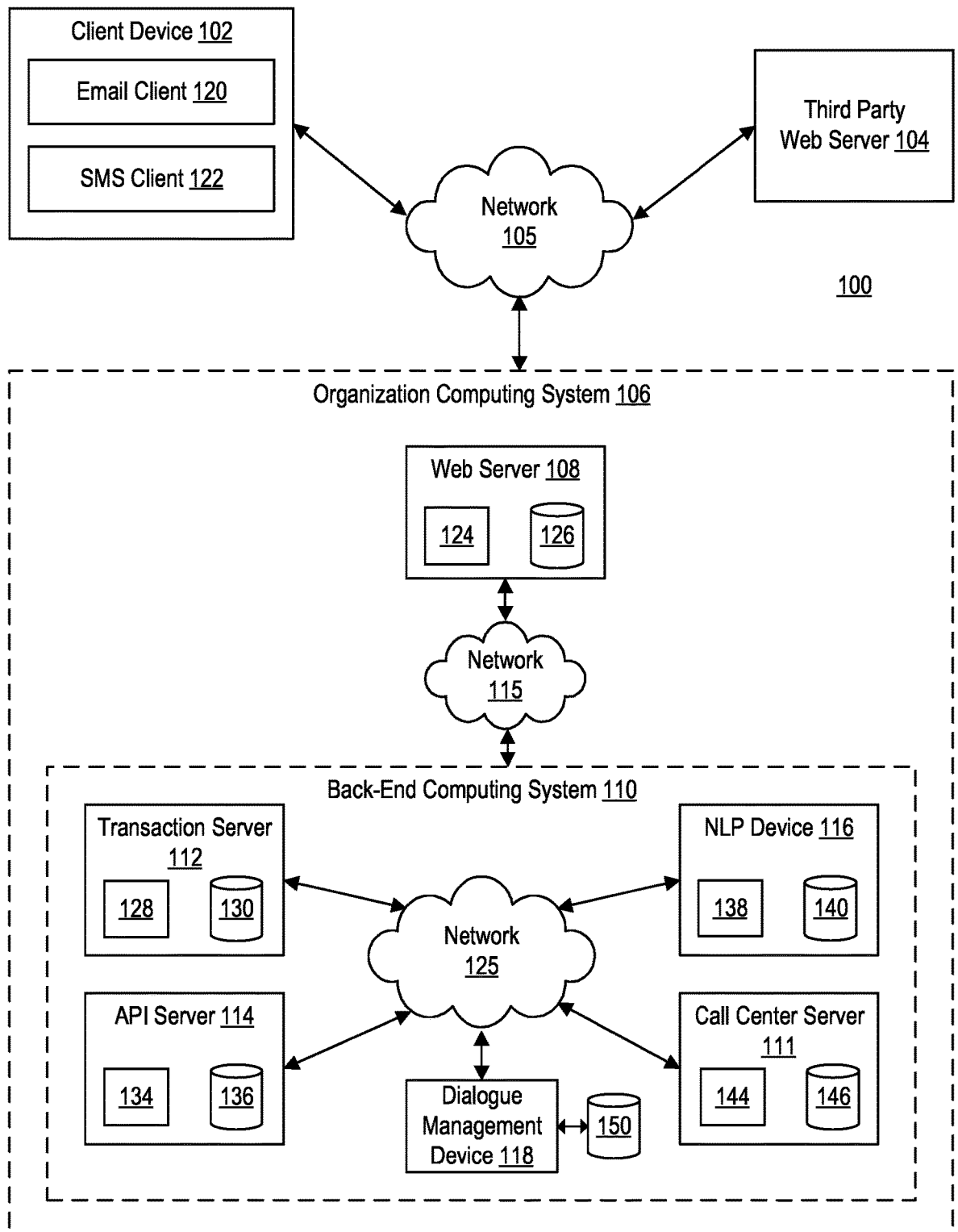
FIG. 1 is a block diagram illustrating a computing environment, according to one embodiment.

FIG. 1 is a block diagram illustrating a computing environment 100, according to one embodiment. Computing environment 100 may include a client device 102, a third party web server 104, and an organization computing system 106 communicating via network 105. Client device 102 may be operated by a user (or customer). For example, client device 102 may be a mobile device, a tablet, a desktop computer, or any computing system having the capabilities described herein. Client device 102 may belong to or be provided by a customer, or may be borrowed, rented, or shared. Customers may include individuals such as, for example, subscribers, clients, prospective clients, or customers of an entity associated with organization computing system 106, such as individuals who have obtained, will obtain, or may obtain a product, service, or consultation from an entity associated with organization computing system 106.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may include any type of computer networking arrangement used to exchange information. For example, network 105 may be the Internet, a private data network, virtual private network using a public network and/or other suitable connection(s) that enables components in computing environment 100 to send and receiving information between the components of environment 100.

Third party web server 104 may include a computer system associated with an entity other than the entity associated with organization computing system 106 and customers that perform one or more functions associated with the organization computing system 106. For example, third party web server 104 may be directed to a server hosting an electronic mail (e-mail) web application or website.

Client device 102 may include at least an e-mail client 120. E-mail client 120 may be representative of a web browser that allows access to a website or a stand-alone application. User of client device 102 may access e-mail client 120 to access functionality of third party web server 104. User operating client device 102 may communicate over network 105 to request a webpage, for example, from third party web server 104. For example, client device 102 may be configured to execute e-mail client 120 to access an e-mail account managed by third party web server 104. The content that is displayed to user of client device 102 may be transmitted from third party web server 104 to client device 102, and subsequently processed by e-mail client 120 for display through a graphical user interface (GUI) of client device 102.

Organization computing system 106 may be associated with or controlled by an entity, such as a business, corporation, individual partnership, or any other entity that provides one or more of goods, services, and consultations to individuals such as customers.

Organization computing system 106 may include one or more servers and computer systems for performing one or more functions associated with products and/or services provided by the organization associated with organization computing system 106. Organization computing system 106 includes a web server 108 and a back-end computing system 110 communicating via local network 115.

Web server 108 may include a computer system configured to generate and provide one or more websites accessible to users or customers, as well as any other individuals involved in organization computer system's 106 normal operations. For example, web server 108 may include a computer system configured to receive communications from a client device 102 via a mobile application, a chat program, an instant messaging program, a voice-to-text program, an SMS message, email, or any other type or format of written or electronic communication. In particular, web server 108 may include a computer system configured to receive communications from a client device 102 via, for example, e-mail client 120 executing on client device 102 or via SMS client 122 executing on client device 102.

Web server 108 may have one or more processors 124 and one or more web server databases 126, which may be any suitable repository of website data. Information stored in web server 108 may be accessed (e.g., retrieved, updated, and/or added to) via local network 115 by one or more devices of back-end computing system 110. In some embodiments, processor 124 may be used to implement an automated natural language dialogue system that may interact with a customer via different types of communication channels, such as a website, mobile application, instant messaging application, SMS message, email, or any other type of electronic communication. For example, when receiving an incoming HTTP request from email client 120 executing on client device 102, web server 108 may parse the HTTP request to identify a customer associated with the client device 102 (e.g., via a customer identifier) and a request contained in the HTTP request (e.g., via a request identifier), and transmit the customer identifier and request identifier to back-end computing system 110 for further processing. In some embodiments, web server 108 may transmit a web page to client device 102 for display, via a web browser executing thereon, to confirm receipt of the HTTP request.

Back-end computing system 110 may be configured to communicate with web server 108 via network 115. For example, based on the HTTP request received by web server 108 from email client 120 of client device 102, web server 108 may transmit one or more parameters to back-end computing system 110 via an application programming interface (API) call. The API call may include information indicative of a request to initiate an interactive chat session between client device 102 and back-end computing system 110. For example, the API call may include a request identifier corresponding to a request selected by a customer of client device 102.

In operation, for example, a user of client device 102 may be prompted with an email communication from web server 108. The email may include one or more pre-defined hyperlinks embedded therein. Each of the one or more pre-defined hyperlinks may be indicative of a respective dialogue request. For example, one or more of the pre-defined hyperlinks may be directed to "Check Balance," "When is my payment due," "Transfer funds," and the like. Upon selecting a pre-defined hyperlink, email client 120 submits an HTTP request to web server 108. The HTTP request includes a request identifier corresponding to the request associated with the selected hyperlink and a user identifier corresponding to the user of client device 102. Upon receiving the HTTP request, web server 108 may submit an API call to back-end computing system 110 for further processing.

Back-end computing system 110 may include a call center server 111, a transaction server 112, an API server 114, an NLP device 116, and a dialogue management device 118. Call center server 111 may include a computer system configured to receive, process, and route telephone calls and other electronic communications between a customer operation client device 102 and dialogue management device 118. Call center server 111 may include one or more processors 144 and one or more call center databases 146, which may be any suitable repository of call center data. Information stored in call center server 111 may be accessed (e.g., retrieved, updated, and/or added to) via local network 125 and or local network 115 by one or more devices (e.g., dialogue management device 118) of back-end computing system 110. In some embodiments, call center server processor 144 may be used to implement an interactive voice response (IVR) system that interacts with the customer over the phone.

Transaction server 112 may include a computer system configured to process one or more transactions involving an account associated with customers, or a request received from customers. In some embodiments, transactions may include, for example, a product/service purchase, a product/service return, financial transfer, financial deposit, financial withdrawal, financial credit, financial debit, dispute request, warranty coverage request, account balance request, and any other type of transaction associated with the products and/or services that an entity associated with organization computing system 106 provides to individuals, such as customers. Transaction server 112 may include one or more processors 128 and one or more transaction server databases 130, which may be any suitable repository of transaction data. Information stored in transaction server 112 may be accessed (e.g., retrieved, updated, added) via local network 125 and/or local network 115 by one or more devices of organization computing system 106.

Dialogue management device 118 may include one or more computer systems configured to receive and/or compile information from a plurality of sources, such as web server 108, call center server 111, and transaction server 112, correlate received and/or compiled information, analyze the compiled information, arrange the compiled data, generate derived information based on the compiled information, and store the compiled and derived information in a database (e.g., database 150). According to some embodiments, database 150 may be a database associated with the organization of organization computing system 106 and/or its related entity that stores a variety of information relating to customers, transactions, and business operations. Database 150 may also serve as a back-up storage device and may contain data and information that is also stored on, for example, databases 130, 136, 140, and 146. Database 150 may be accessed by dialogue management device 118. For example, database 150 may be used to store records of every interaction, communication, and/or transaction a particular costumer has with organization computing system 106 and/or its related entities. Such recording storing aids in creating an ever-evolving customer context that allows dialogue management device 118 to provide customized and adaptive dialogue when interacting with the customer.

In one example, dialogue management device 118 may receive a request as a result of a user clicking a pre-defined hyperlink embedded in a received email. In this example, after dialogue management device 118 receives the API call from web server 108, dialogue management device 118 may parse the API call to extract the customer identifier and the request identifier from the API call, and generate a command to place in a command queue, as described in detail below.

API server 114 may include a computer system configured to execute one or more APIs that provide various functionalities related to the operations of organization computing system 106. In some embodiments, API server 114 may include an API adapter that allows API server 114 to interface with and utilize enterprise APIs maintained by organization computing system 106 and/or an associated entity that may be housed on other systems or devices. In some embodiments, APIs may provide functions that include, for example, retrieving customer account information, modifying customer account information, executing a transaction related to an account, scheduling a payment, authenticating a customer, updating a customer account to opt-in or opt-out of notifications, and any other such function related to management of customer profiles and accounts. API server 114 may include one or more processors 134 and one or more API databases 136, which may be any suitable repository of API information. Information stored in API server 114 may be accessed via local network 125 and/or local network 115 by one or more components of organization computing system 106. In some embodiments, API processor 134 may be configured to access, modify, and retrieve customer account information.

Natural language processing (NLP) device 116 may include a computer system configured to receive and processing incoming dialogue messages and determine a meaning of the incoming dialogue message. NLP device 124 may be configured to receive and execute a command that includes an incoming dialogue message where the command instructs NLP device 116 to determine the meaning of the incoming dialogue message. NLP device 116 may be configured to continuously monitor or intermittently listen for and receive commands from a command queue to determine if there are any new commands directed to NLP device 116. Upon receiving and processing an incoming dialogue message, NLP device 116 may output the meaning of an incoming dialogue message in a format that other devices can process.

In one example, the received dialogue message may be the result of a user clicking a pre-defined hyperlink embedded in a received email. In this example, after dialogue management device 118 receives the API call from web server 108, dialogue management device 118 may parse the API call to extract the customer identifier and the request identifier form the API call, and generate a command to place in the command queue. NLP device 116 may identify that a new command is directed to NLP device 116, and may subsequently respond to the user's request. In a particular example, a user may select a hyperlink labeled "Check my balance." In response to the user selecting the hyperlink, email client 120 may transmit an HTTP request to web server 108. Web server 108 may parse the HTTP request to identify a request identifier and a user identifier contained therein. Web server 108 may pass the request identifier and user identifier to back-end computing system 110 via an API call. Dialogue management device 118 may identify the request identifier and user identifier in the API call, and generate a command to be placed in an event queue for NLP device 116. Upon determining that a command is directed for NLP device 116, NLP device 116 may parse the request and generate a response to be transmitted to the user via a text message.

In some embodiments, dialogue management system 118 may receive a dialogue message from the user that is not in the form of an API call. In some embodiments, the dialogue message may be in response to a clarification question submitted by organization computing device. Dialogue management system 118 may place the dialogue message in a command queue, accessible by NLP device 116. NLP device may identify that a new command is directed to NLP device 116, and may generate a response to the user's dialogue message. For example, NLP device 116 may generate a message to be transmitted to user, to invite the user to supply further information.

NLP device 116 may include one or more processors 138 and one or more NLP databases 140. Information stored in NLP device 116 may be accessed via local network 115 and/or local network 125 by one or more components of organization computing system 106. In some embodiments, NLP processor 140 may be used to implement an NLP system that may determine the meaning behind a string of text and convert it to a form that can be understood by other devices.

Each of local network 115 and local network 125 may comprise any type of computer networking arrangement used to exchange data in a localized area, such as Wi-Fi, Bluetooth™ Ethernet, and other suitable network connections that enable components of organization computing system 106 to interact with one another and to connect to network 115 and/or network 125 for interacting with components in computing environment 100. In some embodiments, local network 115 and/or local network 125 may include an interface for communicating with or linking to network 105. In some embodiments, components of organization computing system 100 may communicate via network 105, without a separate local network 115 and/or network 125.

Figure 2:
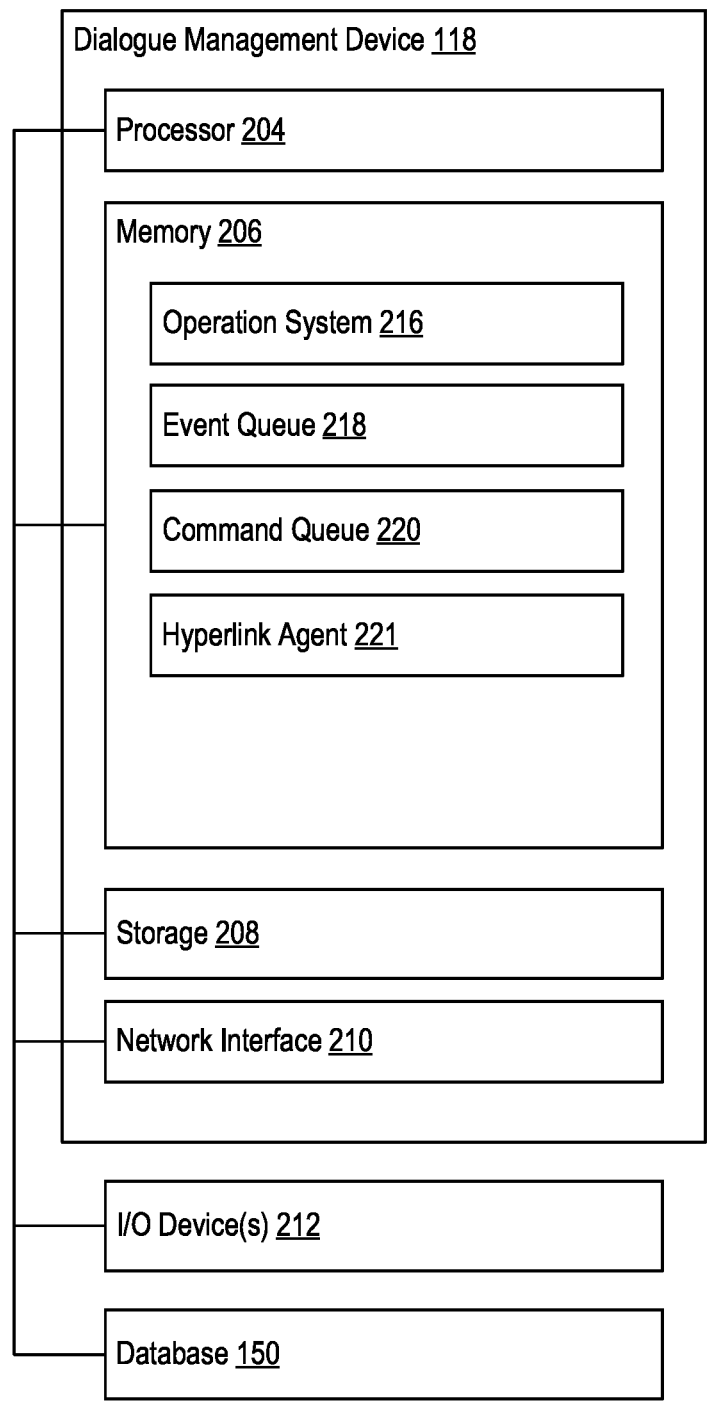
FIG. 2 is a block diagram illustrating a dialogue management device from the computing environment of FIG. 1, according to one embodiment.

FIG. 2 is a block diagram illustrating dialogue management device 118 in more detail, according to one embodiment. As illustrated, dialogue management device 118 includes a processor 204, a memory 206, a storage 208, and a network interface 210. In some embodiments, dialogue management device 118 may be coupled to one or more I/O device(s) 222.

In some embodiments, dialogue management device 118 may be in communication with database 150. Database 150 may store information to enable dialogue management device 118 to perform one or more of the processes and functionalities associated with the disclosed embodiments. Database 150 may include stored data relating to a customer profile and customer accounts, such as, for example, customer identification information (e.g., name, age, sex, birthday, address, VIP status, key customer status, preferences, preferred language, vehicle(s) owned, greeting name, channel, talking points, bank accounts, mortgage loan accounts, car loan accounts, account numbers, authorized users associated with one or more accounts, account balances, account payment information, and any other information that may be related to a user's account). Database 150 may store customer interaction data that includes records of previous customer service interactions with a customer via a website, SMS message, a chat program, a mobile application, an IVR system, or notations taken after speaking with a customer service agent. Database 150 may also include information about business transactions between organization computing system (or its related entities) and a customer that may be obtained from transaction server 112. Database 150 may also include customer feedback data, such as an indication of whether an automated interaction with a customer was successful, online surveys filled out by a customer, surveys answered by a customer following previous interaction to the company, digital feedback provided through websites or mobile application associated with the organization, and the like.

Processor 204 may include one or more of a microprocessor, microcontroller, digital processor, co-processor, or the like, or combinations thereof executing stored instructions and operating upon stored data. Processor 204 is included to be representative of a single processor, multiple processors, a single processor having multiple processing cores, and the like.

Network interface 210 may be any type of network communications enabling dialogue management device 118 to communicate externally via one or more of local network 125, local network 115, and/or network 105. In one example, network interface 210 may allow dialogue management device 118 to communicate locally with one or more components of back-end computing system 110 and/or web server 108. In one example, network interface 210 may allow dialogue management device 118 to communicate externally with client device 102.

Storage 208 may be, for example, a disk storage device. Although shown as a single unit, storage 208 may be a combination of fixed and/or removable storage devices, such as fixed disk drives, removable memory cards, optical storage, network attached storage (NAS), storage area network (SAN), and the like.

Memory 206 may be representative of any suitable memory device such as volatile or non-volatile memory, random access memory (RAM), read only memory (ROM), and the like. Memory 206 may include instructions that enable processor 204 to execute one or more applications, such as server applications, network communication processes, and the like. Memory 206 may include operating system 216, event queue 218, command queue 220, and hyperlink agent 221.

Event queue 218 may be configured to temporarily store queued events. Command queue 220 may be configured to temporarily store queued commands. Processor 204 may receive events from event queue 218, and in response to processing the event, generate one or more commands to be output to command queue 220. In some embodiments, dialogue management device 118 may place commands in command queue 220 in an order they are generated. Each command may be designated to be executed by one or more devices, such as, for example, web server 108, call center server 111, transaction server 112, API server 114, and/or NLP device 116. Each such device may continuously or intermittently monitor command queue 220 to detect one or more commands that are designated to be executed by the monitoring device, and may access pertinent commands. Event queue 218 may receive one or more events from other devices, such as, for example, client device 102, web server 108, call center server 111, transaction server 112, API server 114, and/or NLP device 116.

Hyperlink agent 221 may be configured to generate one or more hyperlinks to be embedded in an email correspondence to one or more users. For example, hyperlink agent 221 may generate one or more hyperlinks specific to a particular user based on user-specific information contained in database 150. Each hyperlink generated by hyperlink agent 221 may be directed to a particular request. Such requests may include, for example, retrieving customer information (e.g., retrieve an account balance), performing an account action, executing an opt-in/opt-out command, and the like.

While dialogue management device 118 has been described as one form for implementing one or more techniques described herein, those having ordinary skill in the art will appreciate that other, functionally equivalent techniques may be employed.

Figure 3:
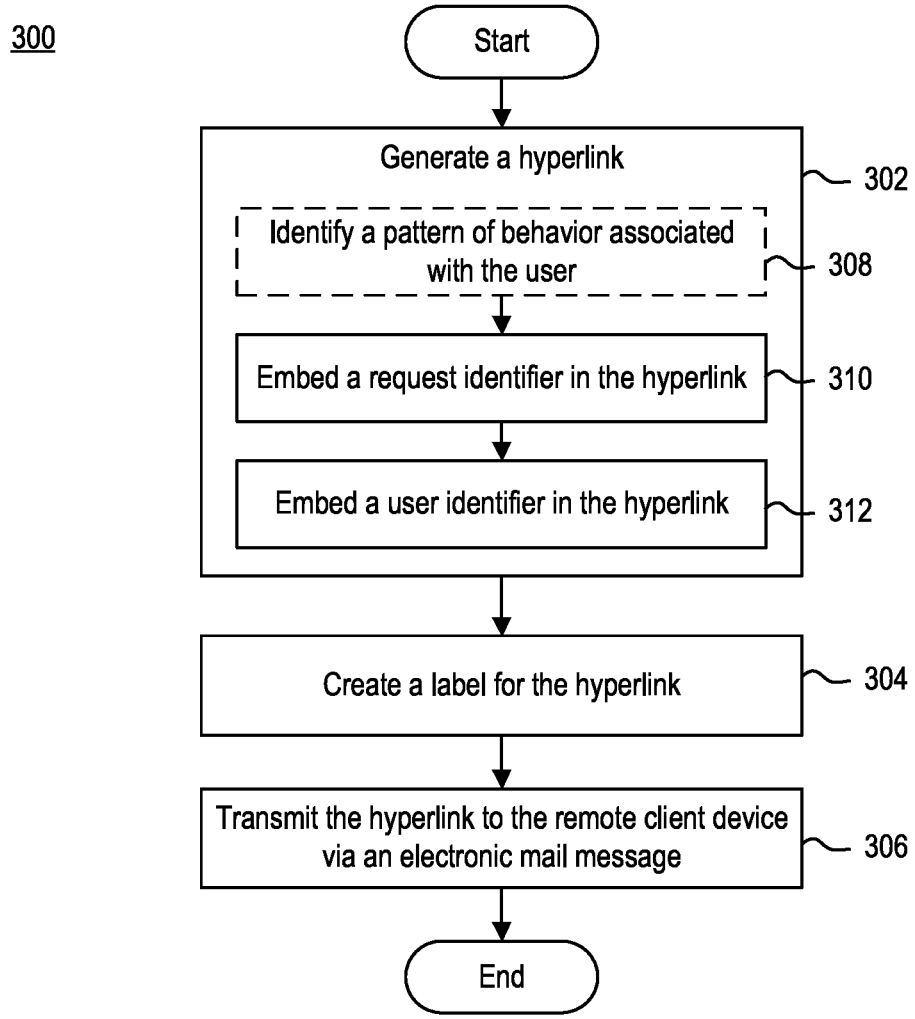
FIG. 3 is a flow diagram illustrating a method of establishing a web-based communication channel, according to one embodiment.

FIG. 3 is a flow diagram illustrating an exemplary method of generating one or more hyperlinks, according to one embodiment. Method 300 begins at step 302. At step 302, dialogue management device 118 generates one or more hyperlinks to be embedded (or included) in an email correspondence to a customer (e.g., a user operating client device 102). An example email correspondence may include a context, e.g. a notification, an offer or other communication tailored to a customer. In some embodiments, an example email correspondence may be generated to include information relevant to the context and particular to a customer, e.g., a due date for an upcoming payment, payment amount, etc. In some embodiments, the one or more hyperlinks may be automatically generated based on the context, and may include requests or queries relevant to the context. For example, hyperlink agent 221 may generate one or more hyperlinks to be embedded in the email correspondence to the customer based on information associated with the customer and the context of the email correspondence. In some embodiments, the one or more hyperlinks may be generated based on anticipated requests or queries learned to be relevant to a context of the email correspondence to aid in customer action concerning the context. The anticipated requests may be learned based on past interactions with the customer, and/or based on historical interactions with a plurality of customers. The anticipated requests may be generated based on one or more machine learning models trained on historical data across a plurality of customers. The requests or queries, via the hyperlink, may serve to initiate an interactive chat in an alternative communication channel, as described elsewhere herein. Step 302 includes substeps 308-312.

At step 308, dialogue management device 118 may identify one or more patterns of behavior associated with the user. In some embodiments, hyperlink agent 221 may query database 150 to identify one or more recorded customer service interactions between the customer and organization computing system 106. For example, hyperlink agent 221 may parse the one or more recorded customer service interactions to identify a pattern of behavior of the user. In one example, hyperlink agent 221 may identify that customer emails the organization to confirm that organization has received their monthly payment. In another example, hyperlink agent 221 may identify that a customer calls the organization prior to transferring funds among accounts.

In some embodiments, hyperlink agent 221 may query database 150 to identify one or more characteristics of the user's account with the organization. In one example, hyperlink agent 221 may identify that a user's payment is due the end of the month. In one example, hyperlink agent 221 may identify that a user is interested in a credit card offered by the organization via user's browsing history.

At step 310, dialogue management device 118 may embed a request identifier in the generated hyperlink. The request identifier that is included in the request's underlying hyperlink may be associated with a request or query displayed to the user in the email correspondence. The request identifier may be a unique identifier, such that dialogue management device 118 can easily determine the user's request upon receiving the request identifier. In some embodiments, the request identifier may be a pre-generated identifier that may be used across various customers of organization. Hyperlink agent 221 may store each request identifier in database 150, such that, when hyperlink agent 221 receives the request identifier, hyperlink agent 221 may query database 150 to determine the request associated with the request identifier.

At step 312, dialogue management device 118 may embed a user identifier in the generated hyperlink. For example, hyperlink agent 221 may associate a respective user with a user identifier that is included in the request's underlying hyperlink. The user identifier may be a unique identifier, such that dialogue management device 118 can easily determine the user's identity upon receiving the user identifier. Hyperlink agent 221 may store each user identifier in database 150, such that, when dialogue management device 118 receives the user identifier, dialogue management device 118 may query database 150 to determine the request associated with the request identifier. In some embodiments, rather than generating the user identifier, hyperlink agent 221 may query database 150 to determine if there exists a user identifier generated for the user. If the user identifier for the customer is already generated, hyperlink agent 221 may use the stored user identifier.

Accordingly, hyperlink agent 211 may generate a unique hyperlink for each request, such that each unique hyperlink corresponds to a unique request. Further, in some embodiments, each unique hyperlink includes at least the unique request identifier and the unique user identifier, such that dialogue management device 118 may subsequently identify the customer and their request.

At step 304, dialogue management device 118 may create a label for each hyperlink. In some embodiments, hyperlink agent 118 may create the label, such that each hyperlink takes the form of an actionable button within the email. For example, to submit a request to organization computer system 108, a user may click a button directed to the user's request or question. In one example, the user may submit the request by selecting a button labeled "What's my checking account balance" in the email. The "what's my checking account balance" label may be determined to be relevant to the context of the email correspondence (e.g., credit card payment due), so as to facilitate a customer's action regarding the email correspondence, for example.

At step 306, dialogue management device 118 may transmit the one or more hyperlinks to the remote client device. Dialogue management device 118 may include the one or more hyperlinks in an email to be transmitted to the user. In one example, in which a context of an email correspondence include notification of an upcoming credit card bill, dialogue management device 118 may embed a first hyperlink directed to a balance check request and a second hyperlink directed to a payment request in an email correspondence to the user regarding the user's upcoming credit card bill. As described elsewhere herein, upon selection of a hyperlink, a user may be directed to an alternative communication channel as part of an interactive chat to receive an answer or response to a request represented in the hyperlink. The interactive chat may be part of an SMS or text message dialogue and may be with an intelligent automated assistant as described in U.S. patent application Ser. No. 15/665,960 filed Aug. 1, 2017 titled "Systems and Methods for Providing Automated Natural Language Dialogue with Customers," the entirety of the contents of which are expressly incorporated herein.

In some embodiments, a user or customer may be enrolled or pre-registered (or otherwise configured) to communicate with an assistant (live or automated) via an SMS channel, as similarly described in U.S. patent application Ser. No. 15/916,521 filed Mar. 9, 2018, titled "Systems and Methods for Controlling Enrollment and Secure Persistent SMS Texting Account Servicing with an Intelligent Assistant," the entirety of the contents of which are expressly incorporated herein. In some embodiments, where the user or customer may not yet have consented to communicate with text or may not otherwise be enrolled or registered to communication with an assistant via an SMS channel, the email transmitted to user with the one or more hyperlinks included therein includes a request, consent or authorization to enable the organization to contact or interact with the user via text message. For example, the email transmitted to the user may include a statement that selecting one of the hyperlinks corresponds to the user implicitly granting organization computing system 106 authorization to contact user via text message.

FIG. 4 is a flow diagram illustrating a method 400 for establishing an interactive chat session (e.g., initiating an interactive chat dialogue) via a hypertext transfer protocol (HTTP) request, according to one embodiment. Method 400 begins at step 402. At step 402, client device 102 may transmit an HTTP request to organization computing system 106. For example, email client 120 executing on client device 102 may transmit the HTTP request to web server 108. Email client 120 may transmit the HTTP request to web server 108, upon detecting that user of client device 102 has acted upon one or more hyperlinks embedded in an email communicated from organization computing system 106 to client device 102. For example, organization computing system 106 may generate an email correspondence that includes one or more hyperlinks embedded therein. The email correspondence may be transmitted to third party web server 104 that manages the email account of the user. Third party web server 104 may transmit the email correspondence to client device 102 via email client 120 executing thereon. In some embodiments, the operation of transmitting the HTTP request to web server 108 may establish a communication channel between user and organization. For example, transmitting the HTTP request to web server 108 may establish a web-based communication channel between client device 102 and organization computing system 106.

At step 404, web server 108 receives the HTTP request from client device 102. At step 406, web server 108 generates an API call to be transmitted to back-end computing system 110 based on the received HTTP request. Web server 108 may parse the HTTP request to identify one or more parameters contained therein. For example, web server 108 may parse the HTTP request to identify at least a user identifier and a request identifier contained therein. The user identifier may correspond to the user (or customer) associated with client device 102. The request identifier may correspond to the selected request, represented by the underlying hyperlink. At step 408, web server 108 transmits the API call to back-end computing system 110.

At step 410, back-end computing system 110 may receive the one or more parameters included in the API call from web server 108. In some embodiments, passing the API call from webserver 108 to back-end computing system 110 may initiate or be part of a switch of the communication channel established between organization computing system 106 and client device 102 from a web-based communication channel to a text message-based communication channel.

At step 412, back-end computing system 110 may parse the one or more parameters to identify the user identifier and the request identifier contained therein. At step 414, back-end computing system 110 may associate the identified user identifier to a user account. For example, dialogue management device 118 may query database 150 to determine the user account to which the user identifier corresponds. At step 416, back-end computing system 110 may associate the identified request identifier to a pre-defined request. For example, dialogue management device 118 may query database 150 to determine the pre-defined request to which the request identifier corresponds.

At step 418, back-end computing system 110 may generate a dialogue response to the request. Back-end computing system 110 may generate a response to the request based on information associated with the identified user request. For example, responsive to receiving a request to check the user's account balance, back-end computing system 110 may identify the current balance of user's account, and generate a message that includes "Your account balance is $100." In some embodiments, the message may include further prompts for the user. For example, the message may include "Your account balance is $100. Would you like to make a deposit?" As such, the message generated by back-end computing system 110 may invite the user to respond to the prompt.

At step 420, back-end computing system 110 may transmit the message to the client via a text message-based medium or channel. In some embodiments, back-end computing system 110 may query database 150 to identify a telephone number associated with the user account. For example, back-end computing system 110 may transmit the message to SMS client 122 executing on client device 102 via an SMS-based text message based on the identified telephone number. Back-end computing system 110 transmitting the message to client device 102 may establish an interactive chat dialogue between organization computing system 106 and client device 102. As stated above, in some embodiments, the message may include a further prompt for the user. As such, user may respond to the prompt included in the message from organization computing system 106 via text message. Accordingly, in response to the message "Your account balance is $100. Would you like to make a deposit?" the user may respond "No" via SMS message.

At step 422, client device 102 may receive the text message from back-end computing system 110. For example, client device 102 may receive the text message via SMS client 122 executing thereon. In some embodiments, the user may further correspond with organization computing system 106 via the text message-based communication channel. For example, at some point after receiving the message from back-end computing system 110, client may transmit another request to organization computing system 106 via text message. As such, a chat session established for the interactive chat dialogue between client device 102 and organization computing system 106 may be static.

Although one or more embodiments disclosed herein describe client device 102 receiving an email with one or more hyperlinks contained therein, sending the HTTP request to web server 108, and subsequently receiving a text message from back end computing system 110, those skilled in the art will readily understand that the device receiving the email and sending the HTTP request may be different from the device receiving the text message response. For example, those skilled in the art may contemplate a scenario in which a user may access an email from the user's desktop computer, and subsequently, receiving a text message from back end computing system 110 via their mobile device or tablet.

Figure 5A:
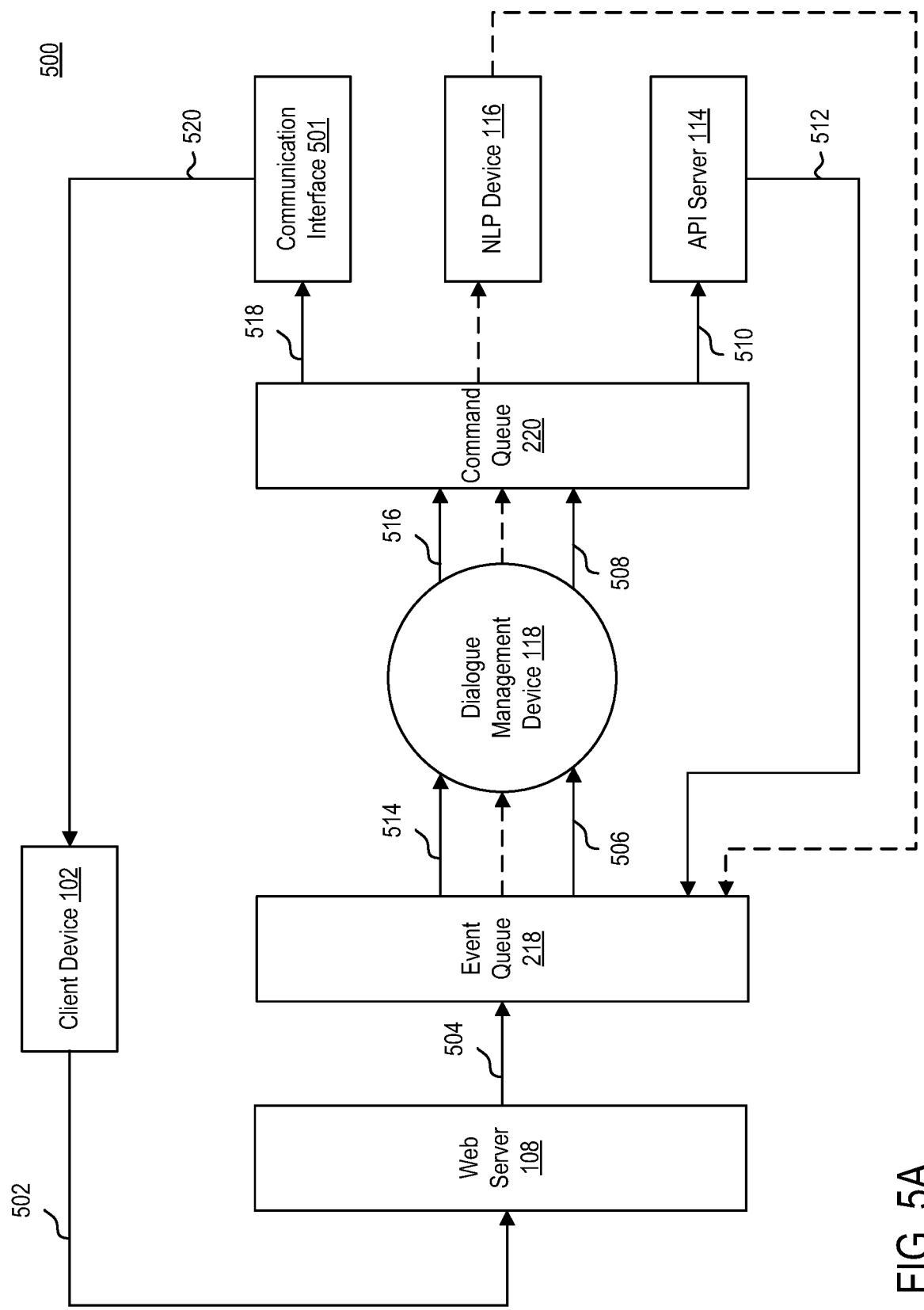
FIG. 5A is a block diagram illustrating interaction of one or more components of a computing environment, according to one embodiment.
Figure 6:
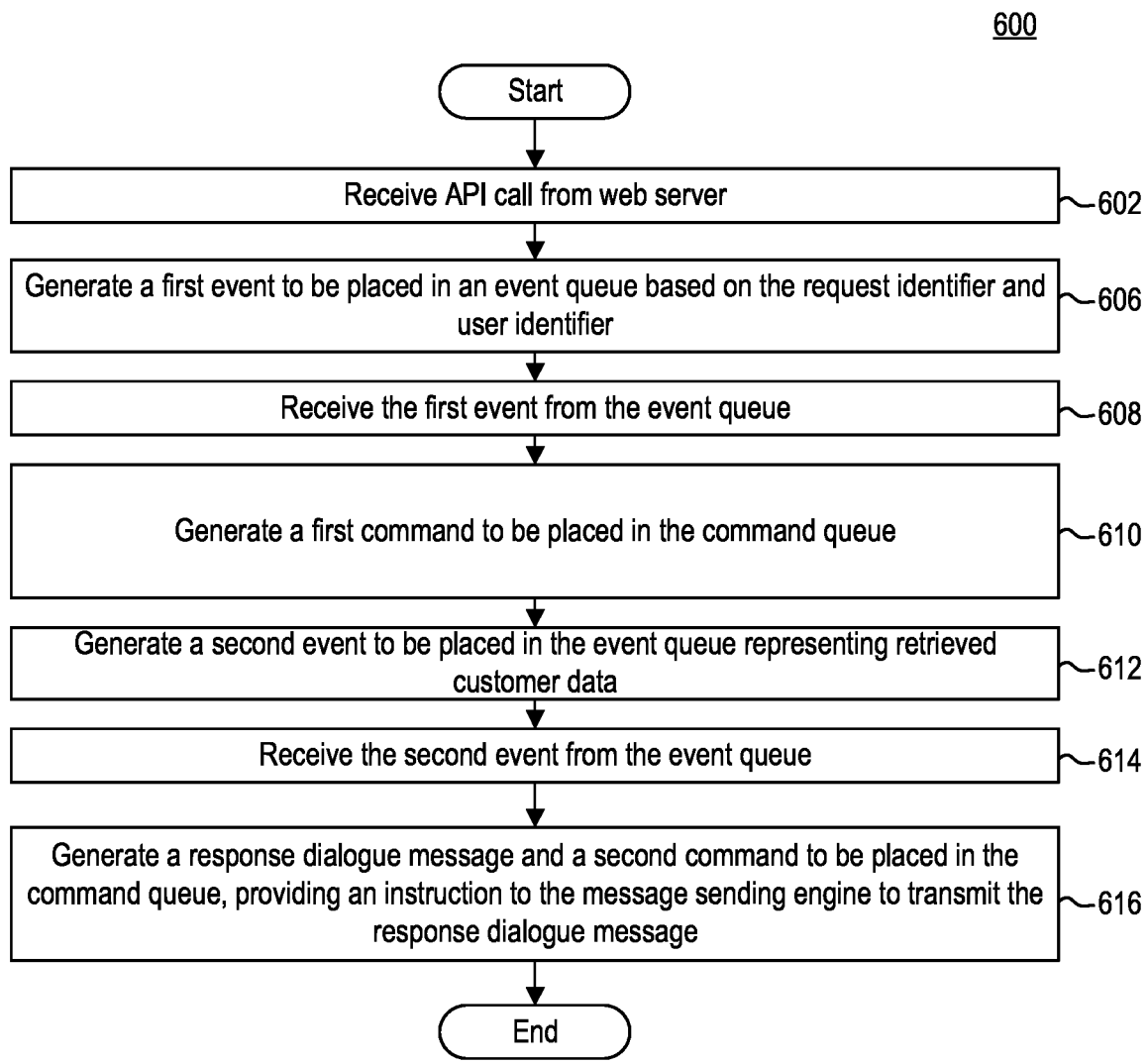
FIG. 6 is a flow diagram illustrating a method of establishing an interactive chat session via a hypertext transfer protocol (HTTP) request, according to one embodiment.

FIG. 5A is a block diagram illustrating an exemplary system functionality diagram 500 for a system establishing an interactive chat session between a client device and an organization, according to one embodiment. The functionality illustrated in FIG. 5A may be executed by one or more components of computing system 100. FIG. 6 is a flow diagram illustrating a method 600 for establishing the interactive chat session between the client device and the organization, according to one embodiment. The one or more steps discussed in conjunction with FIG. 6 may correspond to the system functionality diagram 500 illustrated in FIG. 5A.

As illustrated in FIG. 5A, client device 102 may submit an HTTP request at block 502 to web server 108. The HTTP request may be the result of user of client device 102 selecting an actionable hyperlink embedded in an email correspondence from organization computing system 106. For example, the HTTP request 502 may correspond to user selecting a pre-defined request included in the received email correspondence.

At 504 (e.g., block 602 of FIG. 6), back-end computing system 118 may receive an API call from web server 108. For example, web server 108 may generate an API call to be transmitted to back-end computing system 110. In some embodiments, in operation, web server 108 may parse the HTTP request to identify at least a user identifier and a request identifier contained therein. The user identifier may correspond to the user (or customer) associated with client device 102. The request identifier may correspond to the selected request, represented by the underlying hyperlink.

As shown in FIGS. 5A and 6, at blocks 504 and 606, back-end computing system 110 may generate a first event to be placed in event queue 218 in response to receiving the API call from web server 108. For example, back-end computing system 110 may parse the API call to determine at least the request identifier and the user identifier contained therein. Back-end computing system 110 may generate the first event based on the determined request identifier and the user identifier. Accordingly, the first event may be configured to notify dialogue management device 118, or other components of back-end computing system, the identity of the user and the request submitted by the user. For example, the first event may include the request submitted by the user, the identity of the user submitting the request, the account information associated with the user, and the like. After the first event is created, back-end computing system 110 may place the first event in event queue 218. For example, event queue 218 may be configured to temporarily store one or more events for subsequent processing by dialogue management device 118.

As illustrated above in conjunction with FIG. 2, event queue 218 and command queue 220 may be one or more components of dialogue management device 118. In some embodiments, both event queue 218 and command queue 220 may be one or more components of a device other than dialogue management device 118. For example, those skilled in the art will appreciate that event queue 218 and command queue 220 may be one or more components maintained on a cloud server, accessible by, for example, dialogue management device 118.

In some embodiments, dialogue management device 118 may continuously (or intermittently) monitor event queue 218 for events posted therein. At blocks 506 (FIG. 5A) and 608 (FIG. 6), in response to detecting an event (e.g., the first event) in event queue 218, dialogue management device 118 may receive the event from event queue 218. In some embodiments, the user context may be derived using the user identifier included in the first event. For example, dialogue management device 118 may associate the user identifier with a given user and their user information that is stored in database 150. In some embodiments, the user information may include one or more of account types, account statuses, transaction history, conversation history, people models, an estimate of user sentiment, user goals, user social media information, and the like. The user context may allow back-end computing system 110 to adapt and tailor its responses to a particular customer based on the identified user context. In some embodiments, the user context may be updated each time dialogue management device 118 receives a new event from event queue 218.

At blocks 508 (FIG. 5A) and 610 (FIG. 6), dialogue management device 118 may generate a first command to be placed in command queue 220. In some embodiments, dialogue management device 118 may generate a command based on the processed event, the customer context, and the identified request associated with the request identifier. In some embodiments, upon generating a command, dialogue management device 118 may identify a component that may subsequently execute the command. For example, dialogue management device 118 may determine whether one or more of API server 114, NLP device 116, or communication interface 501 may subsequently execute the command.

At blocks 510, 512 (FIG. 5A) and 612 (FIG. 6), API server 114 may receive the first command from command queue 220, execute the first command, and generate a second event to be placed in event queue 218. In some embodiments, API server 114 may continuously or intermittently monitor command queue 220 to detect new commands. Upon receiving a command, API server 114 may perform one or more functions associated with the command. For example, based on the request contained in the command, API server 114 may call up an API stored locally or remotely on another device to retrieve user account information (e.g., retrieve account balance), perform an account action (e.g., make a payment on a customer account), authenticate a customer (e.g., verify customer credentials), and the like. Accordingly, in some embodiments, the second event may represent a retrieved account balance, an acknowledgement of the performance of an account action, etc. Generally, the second event may represent an answer or response to the user's request selection.

At blocks 514 (FIG. 5A) and 614 (FIG. 6), dialogue management device 118 may receive the second event from event queue 218 in response to detecting the second event placed therein. At blocks 516 (FIG. 5A) and 616 (FIG. 6), dialogue management device 118 may, in response to processing the second event, generate a second command to be placed in command queue 220. In some embodiments, dialogue management device 118 may generate the second command based on the processed second event and the user context.

At blocks 518 and 520, communication interface 501 may receive and execute the second command, which may cause communication interface 501 to establish an interactive chat or chat session between client device 102 and organization computing system 106. For example, executing the second command may cause communication interface to transmit (via text message) a response dialogue to client device 102, thereby switching the communication channel between client device 102 and organization computing system 106 from a web-based communication channel to a text message-based communication channel. In some embodiments, communication interface 501 may continuously or intermittently monitor command queue 220 for new commands, and may receive the second command in response to detecting the second command posted to event queue 220. The response dialogue may include the response to the user's selected request. For example, in response to the request to "Check Balance," the response dialogue may include the user's account balance.

In some embodiments, communication interface 501 may be a standalone component having some or all elements of dialogue management device 118, as illustrated in FIG. 2. In some embodiments, communication interface 501 may be integrated into dialogue management device 118 (e.g., as an I/O device 212). In some embodiments, communication interface 501 may be integrated into another component of organization computing system 106, such as, for example, web server 108, call center server 111, transaction server 112, API server 114, or NLP server 116.

Figure 5B:
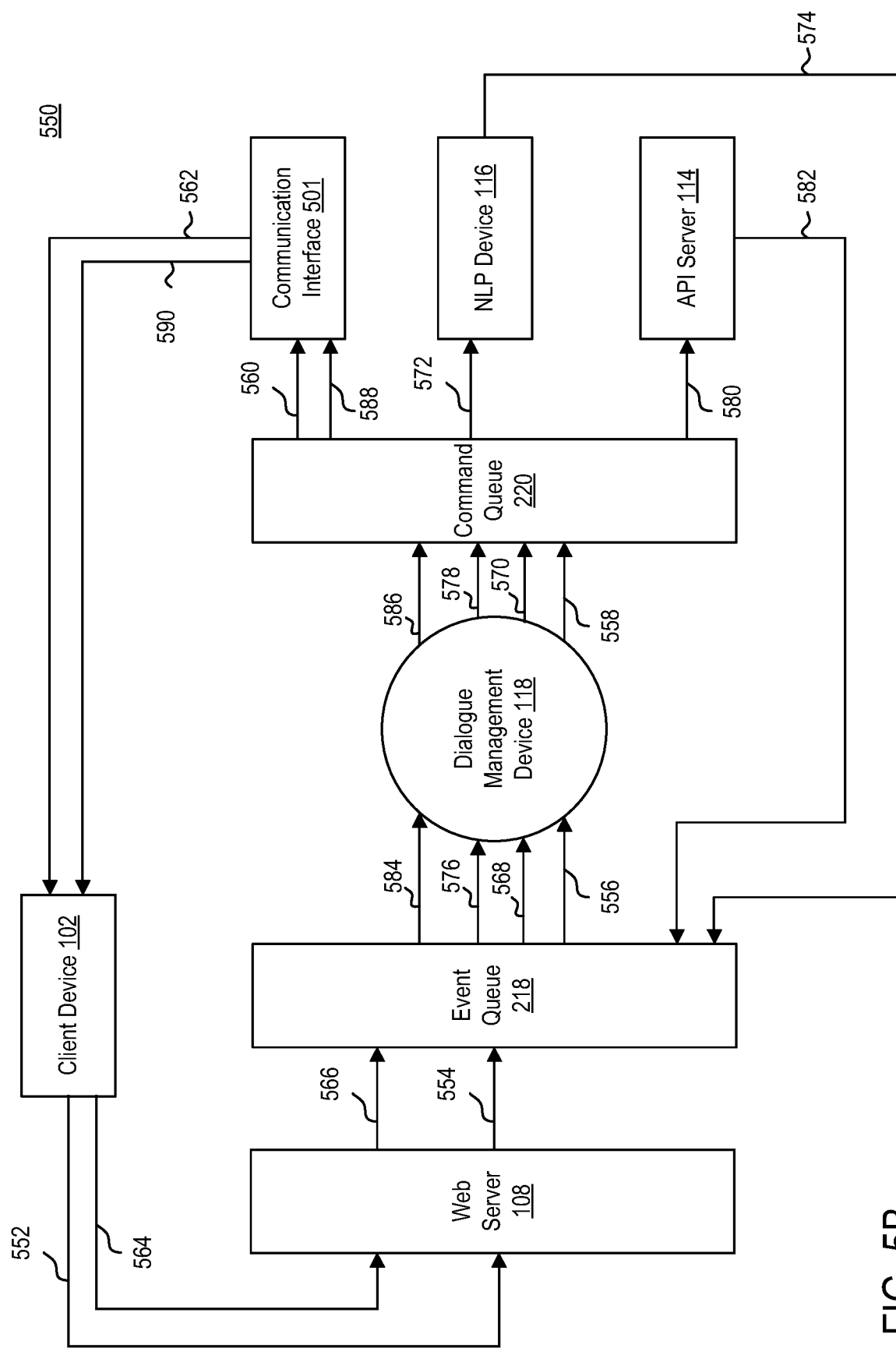
FIG. 5B is a block diagram illustrating interaction of one or more components of a computing environment, according to one embodiment.
Figure 7:
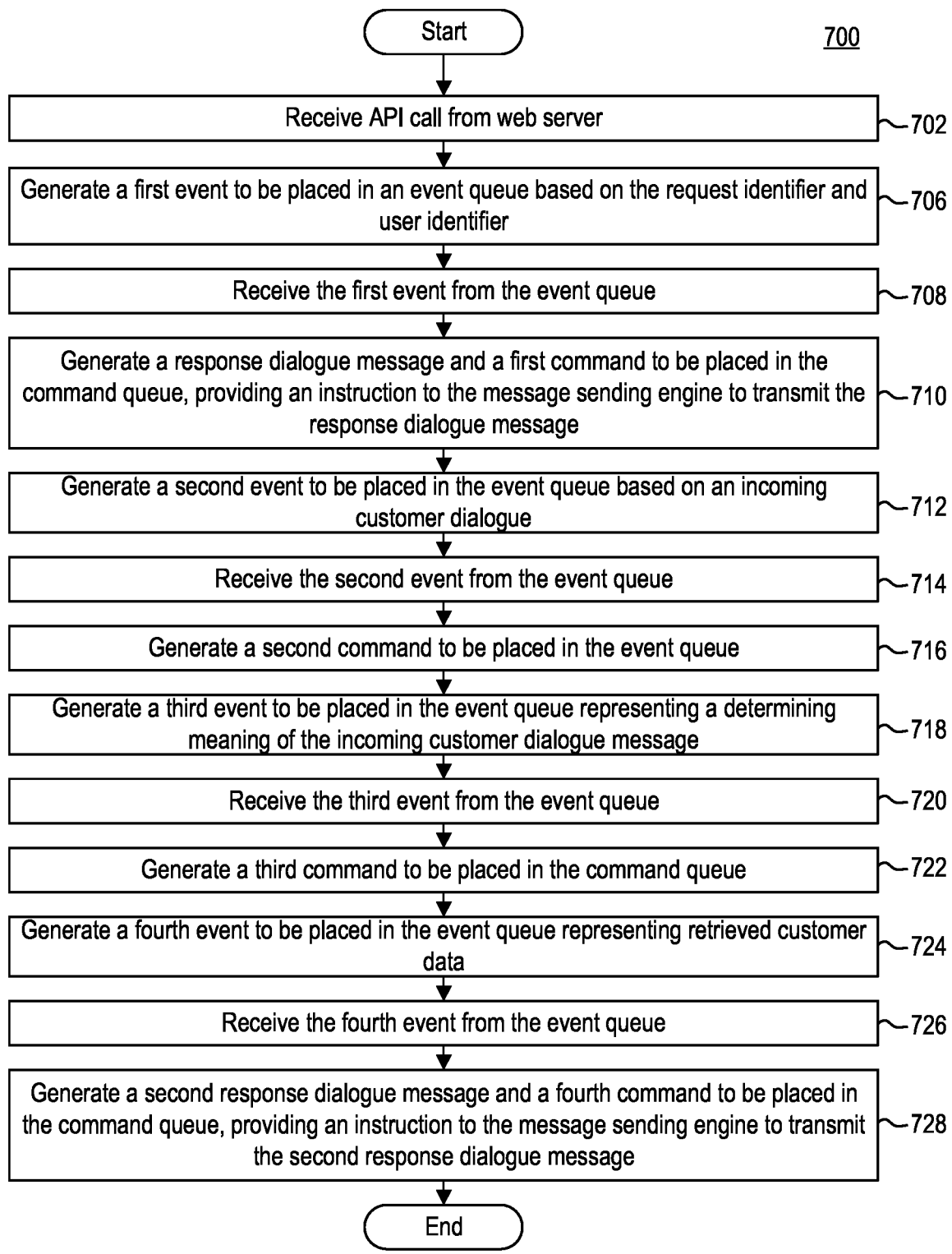
FIG. 7 is a flow diagram illustrating a method of establishing an interactive chat session via a hypertext transfer protocol (HTTP) request, according to one embodiment.

FIG. 5B is a block diagram illustrating an exemplary system functionality diagram 550 for a system establishing an interactive chat or chat session between a client device and an organization, according to one embodiment. The functionality illustrated in FIG. 5B may be executed by one or more components of computing system 100. FIG. 7 is a flow diagram illustrating a method 700 for establishing the interactive chat session between the client device and the organization, according to one embodiment. The one or more steps discussed in conjunction with FIG. 7 may correspond to the system functionality diagram 550 illustrated in FIG. 5B.

As illustrated in FIG. 5B, client device 102 may submit an HTTP request at block 552 to web server 108. The HTTP request may be the result of user of client device 102 selecting an actionable hyperlink embedded in an email correspondence from organization computing system 106. For example, the HTTP request may correspond to user selecting a pre-defined request included in the received email correspondence.

At blocks 554 (FIG. 5B) and 702 (FIG. 7), back-end computing system 118 may receive an API call from web server 108. For example, web server 108 may generate an API call to be transmitted to back-end computing system 118. In some embodiments, in operation, web server 108 may parse the HTTP request to identify at least a user identifier and a request identifier contained therein. The user identifier may correspond to the user (or customer) associated with client device 102. The request identifier may correspond to the selected request, represented by the underlying hyperlink.

As shown in FIGS. 5B and 7, at blocks 554 (FIG. 5B) and 706 (FIG. 7), back-end computing system 110 may generate a first event to be placed in event queue 218 in response to receiving the API call from web server 108. For example, back-end computing system 110 may parse the API call to identify at least the request identifier and the user identifier contained therein. Back-end computing system 110 may generate the first event based on the identifier request identifier and the user identifier. Accordingly, the first event may be configured to notify dialogue management device 118, or other components of back-end computing system, the identity of the user and the request submitted by the user. For example, the first event may include the request submitted by the user, the identity of the user submitting the request, the account information associated with the user, and the like. After the first event is created, back-end computing system 110 may place the first event in event queue 218. For example, event queue 218 may be configured to temporarily store one or more events for subsequent processing by dialogue management device 118.

In some embodiments, dialogue management device 118 may continuously (or intermittently) monitor event queue 218 for events posted therein. At blocks 556 (FIG. 5B) and 708 (FIG. 7), in response to detecting an event (e.g., the first event) in event queue 218, dialogue management device 118 may receive the event from event queue 218. In some embodiments, a user context may be derived using the user identifier included in the first event. For example, dialogue management device 118 may associate the user identifier with a given user and their user information that is stored in database 150.

At blocks 558 and 710, dialogue management device 118 may generate a first command to be placed in command queue 220. In some embodiments, dialogue management device 118 may generate a command based on the processed event, the customer context, and the identified request associated with the request identifier. In some embodiments, upon generating a command, dialogue management device 118 may identify a component that may subsequently execute the command. For example, dialogue management device 118 may determine whether one or more of API server 114, NLP device 116, or communication interface 501 may subsequently execute the command. For example, dialogue management device 118 may determine that further information is needed from user of client device 102 to process the user's request. An example situation may be one in which user requests an account balance but has multiple accounts with organization computing system 106. Accordingly, clarification from user of client device 102 may be needed.

At blocks 560 (FIG. 5B), 562 (FIG. 5B), and 710 (FIG. 7) communication interface 501 may receive and execute the first command, which may cause communication interface 501 to establish an interactive chat session between client device 102 and organization computing system 106. For example, executing the second command may cause communication interface to transmit (via text message) a response dialogue to client device 102, thereby resulting in a switch of the communication channel between client device 102 and organization computing system 106 from a web-based communication channel to a text message-based communication channel. In some embodiments, communication interface 501 may continuously or intermittently monitor command queue 220 for new commands, and may receive the second command in response to detecting the second command posted to event queue 220. The response dialogue may include a clarification request to user. For example, in response to the request to "Check Balance," the response dialogue may include the clarification request: "Why account would you like me to check the balance of? Account A or Account B?"

At blocks 566 (FIG. 5B), and 712 (FIG. 7), back-end computing system may generate a second event to be placed in event queue 218 in response to receiving a customer dialogue message via text message (block 564 of FIG. 5B). In some embodiments, the customer dialogue message may be sent to web server 108, and subsequently transmitted to event queue 218. In some embodiments, the customer dialogue message may be sent directly from client device 102 to event queue 218. In some embodiments, the customer dialogue message may be transmitted to dialogue management device 118, and subsequently transmitted from dialogue management device 118 to event queue 218. The customer dialogue message may include information associated with the clarification request transmitted from communication interface 501 to client device 102.

In some embodiments, dialogue management device 118 may continuously or intermittently monitor event queue 218. At blocks 568 (FIG. 5B) and 714 (FIG. 7) in response to detecting an event (e.g., the second event) in event queue 218, the event may be received at dialogue management device 118. At blocks 570 (FIG. 5B) and 716 (FIG. 7), dialogue management device 118 may, in response to processing the second event, generate a second command to be placed in command queue 220. In some embodiments, dialogue management device 118 may generate the command based on the processed event, clarification provided by the user, and customer context. In some embodiments, when dialogue management device 118 generates a command, such as the second command, dialogue management device 118 may determine an entity that will execute the command. For example, in the embodiment discussed in conjunction with FIGS. 5B and 7, dialogue management device 118 may determine that the second command is to be executed by NLP device 116 in order to determining the meaning of incoming customer dialogue message.

At blocks 572 (FIG. 5B), 574 (FIG. 5B), and 718 (FIG. 7), NLP device 116 may receive the second command from command queue 220. According to some embodiments, NLP device 116 may continuously or intermittently monitor command queue 220 to detect new commands and, upon detecting a new command, may receive the command from command queue 220. Upon receiving a command, NLP device 116 may perform various functions, depending on the nature of the command. For example, in some embodiments, NLP device 116 may determine the meaning of an incoming dialogue message by utilizing one or more artificial intelligence techniques. Such artificial intelligence techniques may include, but are not limited to, intent classification, named entity recognition, sentiment analysis, relation extraction, semantic role labeling, question analysis, rules extraction and discovery, and story understanding.

In some embodiments, NLP device 116 may perform natural language generation in response to receiving a command. In some embodiments, NLP device 116 may perform natural language processing by utilizing one or more artificial intelligence techniques. Such artificial intelligence techniques may include, but are not limited to, content determination, discourse structuring, referring expression generation, lexicalization, linguistic realization, explanation generation. In the exemplary embodiment discussed in conjunction with FIGS. 5B and 7, NLP device 116 may determine the meaning of the incoming customer dialogue message and convert it to a form that may be processed by dialogue management device 118. Accordingly, dialogue management device 118 may generate a third event that represents a determined meaning of the incoming customer dialogue message. NLP device 124 may transmit the third event to event queue 218 (574 of FIG. 5B; 718 of FIG. 7).

At blocks 576 (FIG. 5B) and 720 (FIG. 7), dialogue management device 118 may receive the third event from event queue 218, in response to detecting the third event, according to one or more operations described above. At blocks 578 (FIG. 5B) and 722 (FIG. 7), dialogue management device 118 may, in response to processing the third event, generate a third command to be placed in command queue 220. According to some embodiments, dialogue management device 120 may generate the third command based at least on the processed event and customer context. For example, the third event may represent the user's dialogue message in response to the clarification message. Accordingly the third event may read: "Check balance for Account A."

At blocks 580 (FIG. 5B) and 724 (FIG. 7), API server 114 may receive the third command from command queue 220, execute the command, and generate a fourth event to be placed in event queue 218 (582 of FIG. 5B). According to some embodiments, API server 114 may continuously or intermittently monitor command queue 220 to detect new commands. Upon detecting a new command in command queue 220, API server 114 may receive the command from command queue 220. Upon receiving a command, API server 114 may perform various functions, depending on the nature of the command. For example, in some embodiments, API server 114 may call up an API stored locally or remotely on another device, to retrieve customer information (e.g., retrieve an account balance), perform an account action, or execute an opt-in/opt-out command. Accordingly, continuing with the above example, the fourth event may include the account balance for Account A.

At blocks 584 (FIG. 5B) and 726 (FIG. 7), dialogue management device 118 may receive the fourth event from event queue 218 in response to detecting the fourth event, according to one or more operations discussed above. At blocks 586 (FIG. 5B) and 728 (FIG. 7), dialogue management device 118 may, in response to processing the fourth event, generate a fourth command to be placed in command queue 220. According to some embodiments, dialogue management device 118 may generate the fourth command based on at least the processed fourth event and the customer context. In some embodiments, dialogue management device 118 may also generate a response dialogue message in response to processing the fourth event. In some embodiments, dialogue management device 118 may receive a response dialogue message as an event produced by NLP device 116. In some embodiments, the fourth command may represent a command or instructions to communication interface 501 to transmit the response dialogue message to client device 102.

At blocks 588 (FIG. 5B) and 590 (FIG. 5B), communication interface 501 may receive and execute the fourth command, which may cause communication interface 501 to continue the interactive chat session between client device 102 and organization computing system 106. For example, executing the second command may cause communication interface to transmit (via text message) a response dialogue to client device 102. In some embodiments, communication interface 501 may continuously or intermittently monitor command queue 220 for new commands, and may receive the second command in response to detecting the second command posted to event queue 220. The response dialogue may include the response to the user's selected request. For example, in response to the request to "Check Balance for Account A" (i.e., the clarification response), the response dialogue may include the user's account balance for Account A.

Figure 8:
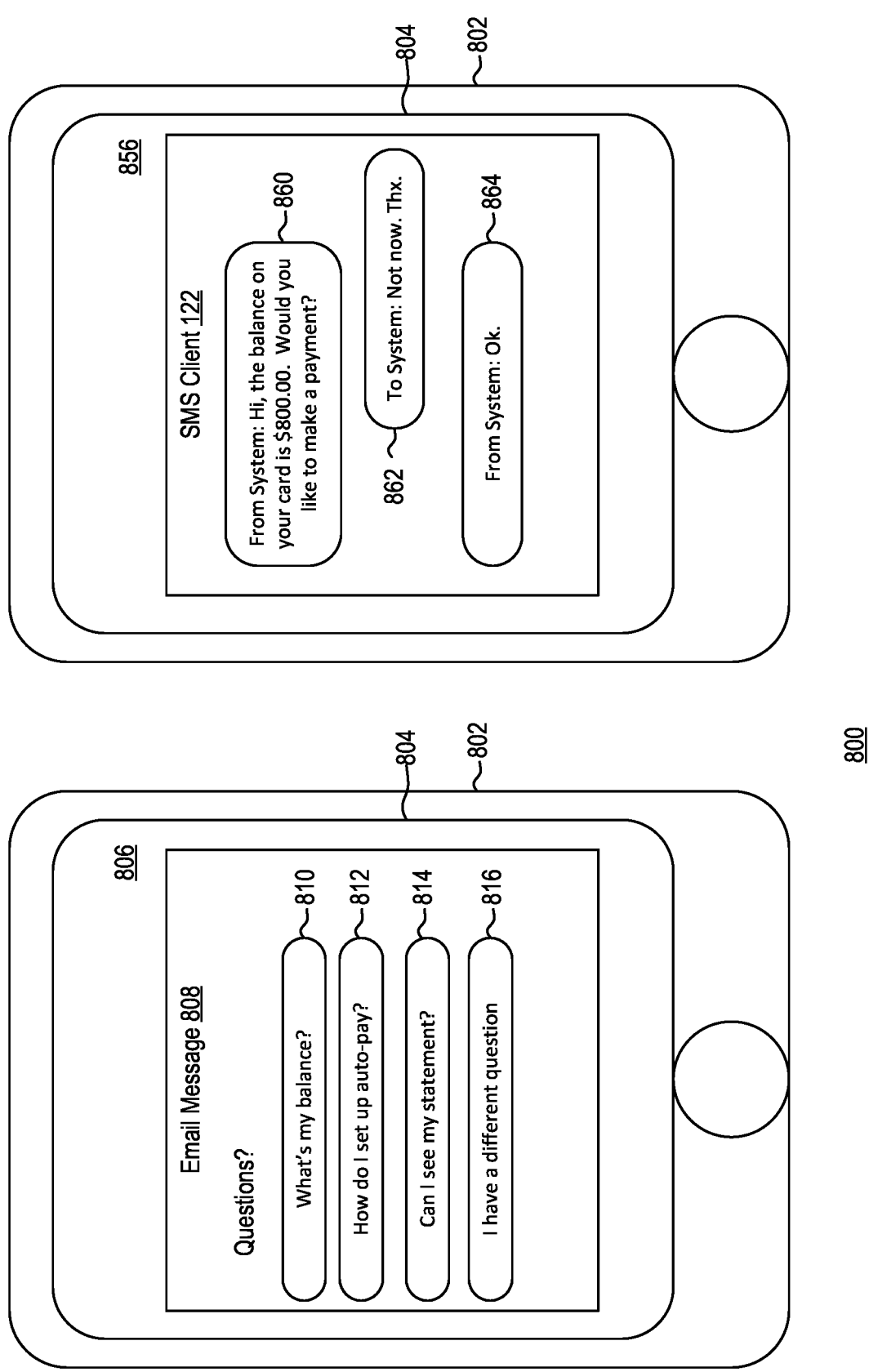
FIG. 8 is a block diagram illustrating one or more screenshots of a client device, according to one embodiment.

FIG. 8 is a block diagram 800 illustrating one or more screenshots of a client device (e.g., client device 102), according to one embodiment. Block diagram includes client device 802. Client device 802 has a screen 804. In one embodiment, captured on screen 804 is a screenshot 806 of user of client device 802 navigating user's email account. As illustrated, screenshot 802 includes an email message 808. Email message 808 may be generated and transmitted from organization computing system 106 to client device 102 via, for example, third party web server 104. As shown, email message 808 includes one or more pre-defined dialogue request prompts 810-816 embedded therein. In some embodiments, the request prompts may be relevant to the context of the email message 808, as described above. Each dialogue request prompt 810-816 includes an underlying hyperlink generated by organization computing system 106. Each underlying hyperlink may include a user identifier corresponding to user of client device 802 and a request identifier corresponding to the dialogue request prompt. Upon selection of a dialogue request prompt 810-816 (e.g., upon selecting dialogue request prompt 810), client device 802 transmits an HTTP request to organization computing system 106 for subsequent processing.

In another embodiment, captured on screen 804 is screenshot 856 of client device 802, executing SMS client 122. Screenshot 856 illustrates an interactive chat sessions established between client device 802 and organization computing system 106. For example, upon selecting dialogue request prompt 810, organization computing system 106 may transmit a text message 860 to client device 802 in response to user's request. As illustrated, text message 860 may include a further question directed to the user. In this example, the further question is "Would you like to make a payment?" In response, user, via client device 802, may submit a text message 862 back to back-end computing system that recites "Not now. Thx." Organization computing system 106 may confirm the response by transmitting a text message 864 that recites "Ok." As such, the initial web-based communication channel established between organization computing system 106 and client device 802 has switched to a text message-based communication channel.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of establishing an interactive communication session between a remote client device and a back-end computing system, comprising:

embedding, by the back-end computing system, one or more pre-generated message prompts in an electronic message, each of the one or more pre-generated message prompts anticipating a user request based on historical interactions with a user and a plurality of other users;

transmitting the electronic message to the remote client device associated with the user;

receiving, by an intelligent automated assistant executing on the back-end computing system, a discussion prompt based on one of the one or more pre-generated message prompts from the remote client device;

parsing, by a natural language processing (NLP) device of the back-end computing system, the discussion prompt to determine a topic corresponding to the discussion prompt;

responsive to the discussion prompt, generating, by the back-end computing system, a textual response in reply to the discussion prompt, the textual response being based on the topic of the discussion prompt;

transmitting, by the back-end computing system via the intelligent automated assistant, the textual response to the remote client device of the user;

receiving, by the back-end computing system via the intelligent automated assistant, a textual reply from the remote client device in response to the textual response;

identifying, by the NLP device of the back-end computing system, an additional discussion prompt contained in the textual reply;

generating, by the back-end computing system, a second textual response comprising an additional textual response to the additional discussion prompt; and transmitting, by the back-end computing system via the intelligent automated assistant, the second textual response to the remote client device.

2. The method of claim 1, wherein each of the one or more pre-generated message prompts are hyperlinks.

3. The method of claim 1, wherein the discussion prompt comprises an identifier corresponding to the user of the remote client device.

4. The method of claim 1, wherein the additional discussion prompt is related to the discussion prompt.

5. The method of claim 1, wherein the additional discussion prompt is unrelated to the discussion prompt.

6. The method of claim 1, further comprising:
continuing an interactive chat between the intelligent automated assistant and the remote client device based on further discussion prompts transmitted by the remote client device.

7. The method of claim 1, wherein parsing, by the NLP device of the back-end computing system, the discussion prompt to determine the topic corresponding to the discussion prompt, comprises:
analyzing the discussion prompt using natural language processing to determine the topic of the discussion prompt.

8. A system, comprising:
a processor; and
a memory having programming instructions stored thereon, which, when executed by the processor, performs operations comprising:
embedding one or more pre-generated message prompts in an electronic message, each of the one or more pre-generated message prompts anticipating a user request based on historical interactions with a user and a plurality of other users;
transmitting the electronic message to a remote client device associated with the user;
receiving, by an intelligent automated assistant executing on the system, a discussion prompt based on one of the one or more pre-generated message prompts from the remote client device;
parsing, by a natural language processing (NLP) device, the discussion prompt to determine a topic corresponding to the discussion prompt;
responsive to the discussion prompt, generating a textual response in reply to the discussion prompt, the textual response being based on the topic of the discussion prompt; and
transmitting, by the intelligent automated assistant, the textual response to the remote client device of the user.

9. The system of claim 8, wherein the operations further comprise:
receiving, via the intelligent automated assistant, a textual reply from the remote client device in response to the textual response;
identifying, by the NLP device, an additional discussion prompt contained in the textual reply;
generating a second textual response comprising an additional textual response to the additional discussion prompt; and
transmitting, via the intelligent automated assistant, the second textual response to the remote client device.

10. The system of claim 9, wherein the additional discussion prompt is related to the discussion prompt.

11. The system of claim 9, wherein the additional discussion prompt is unrelated to the discussion prompt.

12. The system of claim 8, wherein each of the one or more pre-generated message prompts are hyperlinks.

13. The system of claim 8, wherein the discussion prompt comprises an identifier corresponding to the user of the remote client device.

14. The system of claim 8, wherein the operations further comprise:
continuing an interactive chat between the intelligent automated assistant and the remote client device based on further discussion prompts transmitted by the remote client device.

15. The system of claim 8, wherein parsing, by the NLP device, the discussion prompt to determine the topic corresponding to the discussion prompt, comprises:
analyzing the discussion prompt using natural language processing to determine the topic of the discussion prompt.

16. A non-transitory computer readable medium having instructions stored thereon, which, when executed by a processor, causes a computing system to perform operations, comprising:
embedding, by the computing system, one or more pre-generated message prompts in an electronic message, each of the one or more pre-generated message prompts anticipating a user request based on historical interactions with a user and a plurality of other users;
transmitting the electronic message to a remote client device associated with the user;
receiving, by an intelligent automated assistant executing on the computing system, a discussion prompt based on one of the one or more pre-generated message prompts from the remote client device;
parsing, by a natural language processing (NLP) device of the computing system, the discussion prompt to determine a topic corresponding to the discussion prompt and an identifier contained in the discussion prompt, the identifier indicative of the user;
responsive to the discussion prompt, generating, by the computing system, a textual response in reply to the discussion prompt, the textual response being based on the topic of the discussion prompt and the identifier indicative of the user;
transmitting, by the computing system via the intelligent automated assistant, the textual response to the remote client device of the user;
receiving, by the computing system via the intelligent automated assistant, a textual reply from the remote client device in response to the textual response;
identifying, by the NLP device of the computing system, an additional discussion prompt contained in the textual reply;
generating, by the computing system, a second textual response comprising an additional textual response based on the additional discussion prompt and the identifier of the user; and
transmitting, by the computing system via the intelligent automated assistant, the second textual response to the remote client device.

17. The non-transitory computer readable medium of claim 16, wherein each of the one or more pre-generated message prompts are hyperlinks.

18. The non-transitory computer readable medium of claim 16, wherein the additional discussion prompt is related to the discussion prompt.

19. The non-transitory computer readable medium of claim 16, wherein the additional discussion prompt is unrelated to the discussion prompt.

20. The non-transitory computer readable medium of claim 16, wherein parsing, by the NLP device of the computing system, the discussion prompt to determine the topic corresponding to the discussion prompt, comprises:

analyzing the discussion prompt using natural language processing to determine the topic of the discussion prompt.

* * * * *